Oct. 21, 1969      F. C. GUNTHER      3,473,503
AIR-SUPPORTED MARINE VEHICLE
Filed Feb. 7, 1968      3 Sheets-Sheet 1
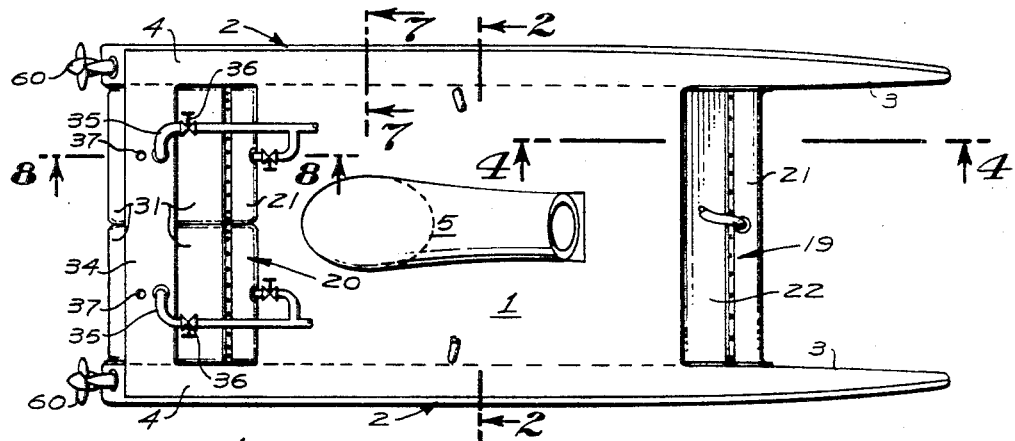
FIG. 1
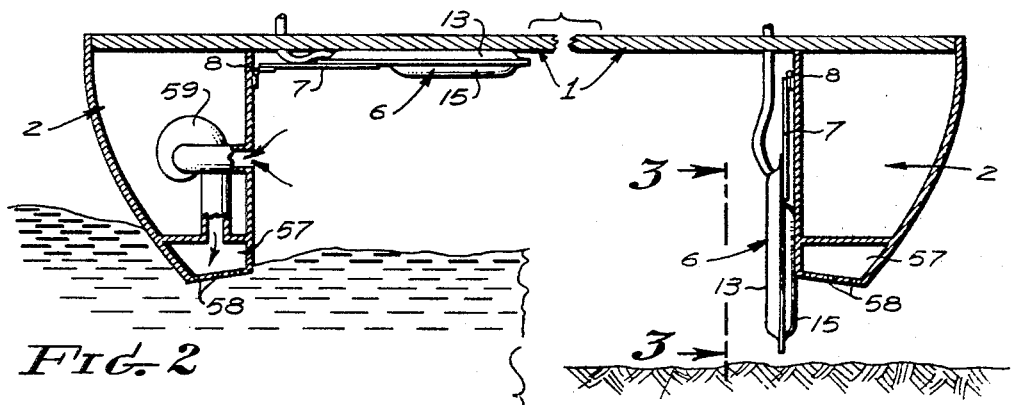
FIG. 2
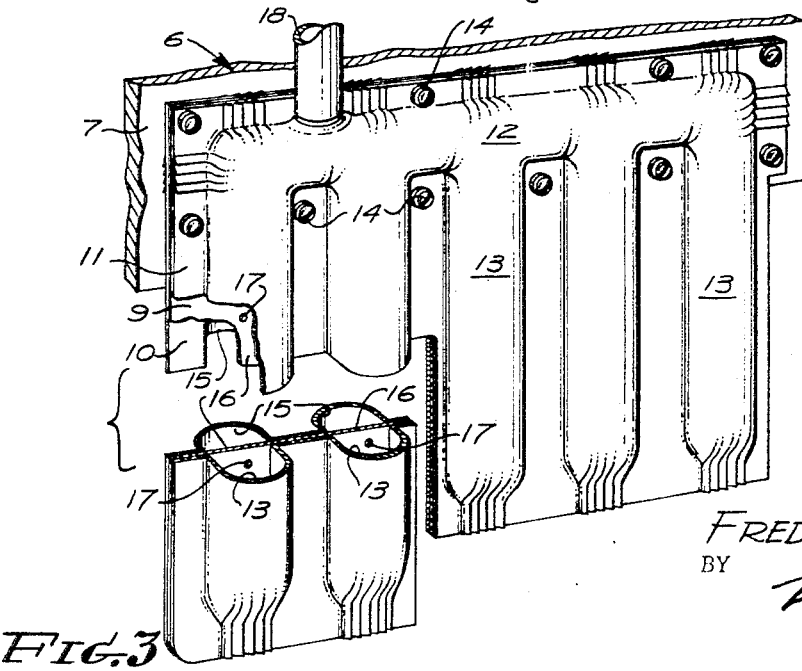
FIG. 3
INVENTOR.
FRED C. GUNTHER
BY
ATTORNEYS Oct. 21, 1969  F. C. GUNTHER  3,473,503
AIR-SUPPORTED MARINE VEHICLE
Filed Feb. 7, 1968  3 Sheets-Sheet 2
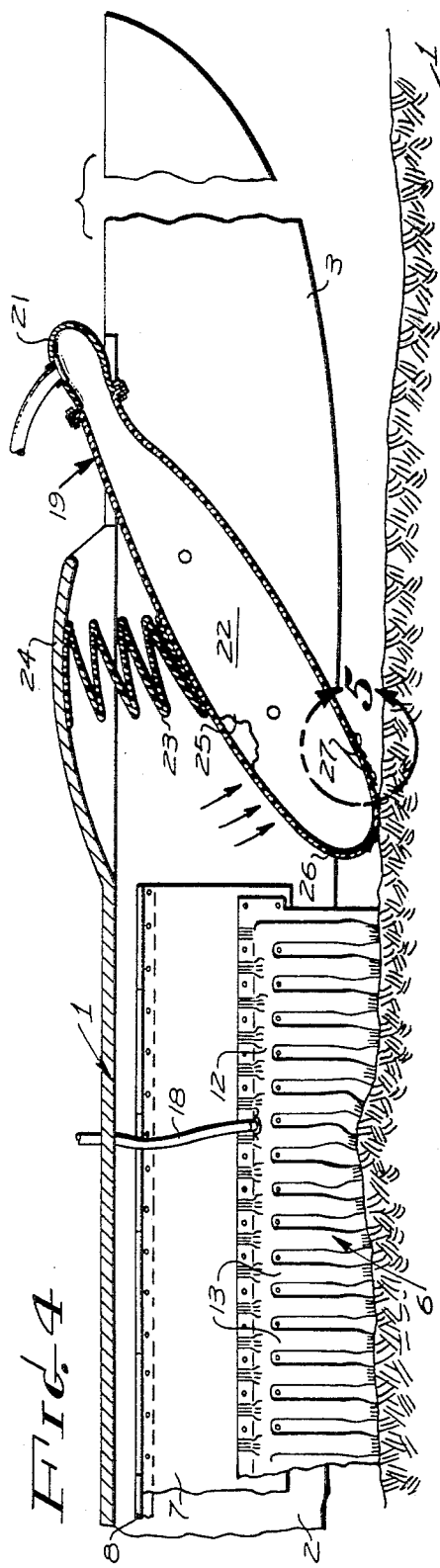
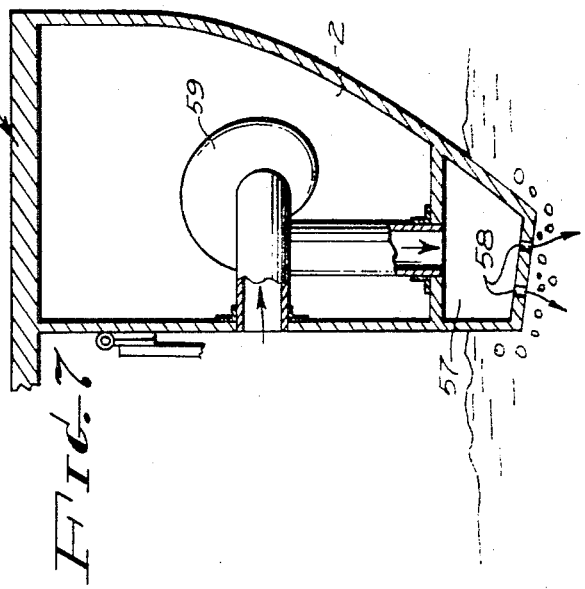
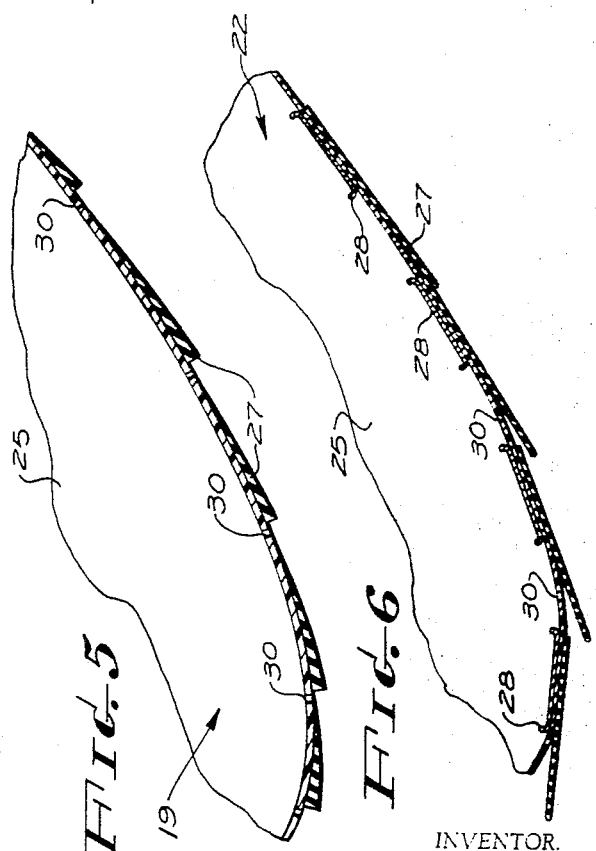
INVENTOR.
FRED C. GUNTHER
BY
Lyon & Lyon
ATTORNEYS Oct. 21, 1969  F. C. GUNTHER  3,473,503
AIR-SUPPORTED MARINE VEHICLE
Filed Feb. 7, 1968  3 Sheets-Sheet 3

INVENTOR.
FRED C. GUNTHER
BY
Lyon & Lyon
ATTORNEYS

United States Patent Office 3,473,503
Patented Oct. 21, 1969

3,473,503
AIR-SUPPORTED MARINE VEHICLE
Fred C. Gunther, 600 Linda Vista Ave.,
Pasadena, Calif. 91105
Filed Feb. 7, 1968, Ser. No. 703,752
Int. Cl. B63b 1/38, 1/36
U.S. Cl. 114—67      10 Claims

ABSTRACT OF THE DISCLOSURE

An air-supported marine vehicle with spaced, oversized, parallel buoyant hulls at opposite sides of a carrier platform, and forward and rearward air-bag seals that define a plenum. The air-bag seals are provided with stepped surfaces to reduce drag. The rearward air-bag is split longitudinally and downloaded differentially by two pneumatic actuators. The plenum is supplied with air by a fan with reserve capacity for high rough-water ride and for amphibious operation. The oversized, reserve-buoyancy hulls provide passive stabilization. In addition, air ejection through perforations in the bottoms of the rigid hull sidewalls produces a bubbly surface layer and thus reduces surface drag. Planing surfaces are provided for water-spray mass addition to the reaction-thrust airflow to augment forward thrust. Inflatable batten flexible sidewall seals are movable into positions extending below the hulls to permit limited amphibious travel over shoals and onto beaches.

BACKGROUND OF THE INVENTION

This invention relates generally to marine vehicles, but more particularly to air-cushioned vehicles, commonly designated ACV, including the captured-air-bubble type, commonly designated CAB.

The conventional displacement boat has two limitations in that its speed is limited by its water line length and that it requires docking facilities.

The planing boat overcomes the speed limitations of the displacement boat at the cost of low inherent stability, poor rough-water performance, and high power requirements.

The conventional, flexible-sidewall ACV combines good rough-water performance and higher speeds than the planing boat with an amphibious capability at the cost of high power requirements and a low cruise efficiency.

The CAB is a large marine vehicle without amphibious capability with a high lift/drag efficiency at high speeds. Because of high-speed wetted surface drag on its immersed sidewall surfaces, CAB sidewalls are minimum-length, thin hulls with negligible reserve displacement that do not provide adequate buoyant attitude stabilization. CAB stabilization requires complex servomechanisms operating control surfaces.

The comparative features of various conventional marine craft and the marine vehicle which is the subject of the present invention are summarized below in tabular form.

|  | Small Displacement Boat | Planing Boat | Conventional Air Cushion Vehicle (ACV) | Captured Air Bubble (CAB) | | Present invention |
|---|---|---|---|---|---|---|
|  |  |  |  | Small | Large |  |
| Favorable size, feet | 7-80 | 10-65 | 30-80 | 30-80 | 80-400 | 20-100. |
| Noise level | Low | Moderate | High | Moderate | Low | Moderate. |
| Inherent stability | Good | Poor | Poor | Fair | Poor | Good. |
| Rough water performance | do | do | Best | do | Fair | Do. |
| Amphibious capability | None | None | Good | None | None | Fair. |
| Power required | Low | High | High | Medium low | Low | Medium. |
| Cruise efficiency | High | Low | Low | Medium high | High | Medium high. |
| Efficient speed, knots | 1-10 | 20-35 | 40-60 | 20-40 | 70-100 | 5-50. |
| Range/duration | Best | Poor | Poor | Good | Good | Good. |
| First cost | Low | High | Very high | Medium | High | Medium. |
| Running cost | Low | do | High | Low | Low | Low. |
| Docking cost | High | do | Low | High | High | Low. |

SUMMARY OF THE INVENTION

The present invention seeks to retain the advantages of the application of the air-cushion-support principle to rigid-sidewall craft while adding desirable characteristics; thus, the objects of this invention include:

First, to provide an air-supported, rigid-sidewall marine vehicle wherein simple attitude stabilization is obtained by means of novel hulls longer than the plenum and with cross sections shaped to provide strong buoyant forces with minor abnormal immersions.

Ssecond, to provide an air-supported, rigid-sidewall marine vehicle wherein rough-water performance is improved by means of the novel use of reserve fan power, which causes the vehicle to ride high in rough water, thereby reducing wetted surface drag on the sidewalls, and also reducing the incidence of wave impact damage and smoothing the rough-water ride.

Third, to provide an air-supported, rigid-sidewall marine vehicle wherein limited amphibious capability is provided by means of the use of reserve fan power combined with novel inflatable batten flexible sidewall seals movable into positions extending below the hulls.

Fourth, to provide an air-supported, rigid-sidewall marine vehice wherein a novel forward inflated air bag provides a low-inertia, low-drag, water-contacting seal by means of novel multiple planing surfaces attached to the air bag and designed to promote clean separation of water flow from the air-bag rearward surface during cruise.

Fifth, to provide an air-supported, rigid-sidewall marine vehicle wherein automatic air-cushion pressure stabilization is obtained by means of novel, dual, air-spring downloaded, rearward, inflated air bags.

Sixth, to provide an air-supported, rigid-sidewall marine vehicle wherein, in small versions of the vehicle, automatic air-cushion pressure stabilization is obtained by means of novel, dual, spring-down-loaded rearward doors.

Seventh, to provide an air-supported, rigid-sidewall marine vehicle wherein forward reaction thrust is augmented by means of novel, spray-producing, retractable planing surfaces forward of the dual rearward inflated air bags or doors.

Eighth, to provide an air-supported, rigid-sidewall marine vehicle wherein wetted skin friction drag is reduced by means of novel air injection of air bubbles into the water boundary layer through perforations in the bottoms of the rigid hulls.

DESCRIPTION OF FIGURES

FIGURE 1 is a diagrammatical, plan view of the air-supported marine vehicle.

FIGURE 2 is an enlarged, substantially diagrammatical, transverse, sectional view, taken through 2—2 of FIGURE 1, showing one side of the vehicle as supported on water and the other as supported above a solid surface.

FIGURE 3 is a fragmentary perspective view of one of the side seals viewed from 3—3 of FIGURE 1.

FIGURE 4 is an enlarged, diagrammatical, fragmentary, longitudinal, sectional view, taken through 4—4 of FIGURE 1, showing the forward portion of the vehicle when landborne.

FIGURE 5 is an enlarged fragmentary, sectional view, taken within circle 5 of FIGURE 4, showing the air-bag seal construction.

FIGURE 6 is a fragmentary, sectional view, similar to FIGURE 5, showing a modified construction.

FIGURE 7 is an enlarged, diagrammatical, sectional view, taken through 7—7 of FIGURE 1.

SPECIFICATION

Figure 8:
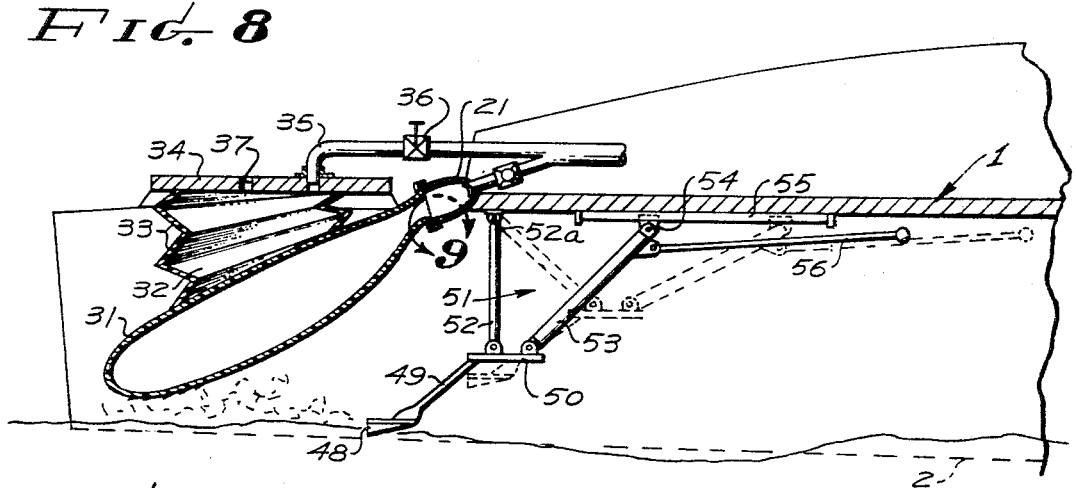
FIGURE 8 is an enlarged, diagrammatical, fragmentary, sectional view, taken through 8—8 of FIGURE 1, showing the rear portion of the vehicle when waterborne.
Figure 9:
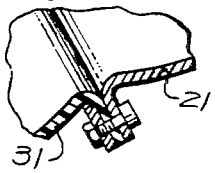
FIGURE 9 is a fragmentary, sectional view of one of the air seal bags, taken within circle 9 of FIGURE 8.

The air-supported marine vehicle includes a carrier platform 1 providing cargo, passenger and machinery space. For purposes of illustration, the carrier platform is shown as a simple platform thickened to carry structural loads. Integrally attached to the platform lateral edges are parallel rigid sidewall hulls 2, including portions 3 projecting forwardly of and portions 4 projecting rearwardly of the carrier platform. The sidewall hulls 2 are hollow and buoyant, of displacement sufficient to support the carrier platform and its loads with the craft at rest in water. During water travel, the sidewall hulls 2 have two functions: (a) as walls to prevent cushion-support air beneath the platform structure from lateral escape; and (b) as reserve buoyancy stabilizers to restrain pitch- and roll-attitude tilting of the craft.

The carrier platform is provided with one or more air-cushion supply fan units 5 which are, per se, conventional but of much larger capacity than is usual with air-cushion, rigid-sidewall marine craft.

In order to permit amphibious operation of the vehicle, a pair of yieldable sidewall seals or hull extensions 6 can be deployed as downward extensions of the rigid sidewalls 2. The yieldable seals 6 are attached to retractable hinged panels 7, whose hinges 8 are attached to the inner surfaces of each sidewall hull 2, slightly below the carrier platform 1. Thus, each panel 7 and yieldable seal 6 may move from a horizontal stowed position underlying the carrier platform 1 to a vertical position alongside the sidewall hull inner surface. The yieldable sidewall seals 6 are attached as cantilevered extensions of the lower edges of the hinged panels.

Flexible-fabric seal skirts for elliptical or circular platform, conventional ACV's are roughly cylindrical in shape, thereby allowing the fabric skirt to be stiffened by fabric hoop tension opposed to cushion pressure. The present yieldable sidewall seals 6 must be, in their normal condition, straight and planar, hence are not so stiffened by hoop tension.

Each seal 6 comprises three sheets of fabric reinforced rubber or other elastomer which are flexible but essentially nonstretchable. The sheets are sewn or bonded together to provide a center sheet 9, an underlying sheet 10 and an overlying sheet 11, as shown in FIGURE 3. The overlying sheet 11 is preformed or gathered and sewn to the center sheet 9 in such a manner as to form a horizontal manifold duct 12 and a plurality of hollow, vertical pockets 13 extending from the manifold and closed at their lower ends. The manifold and upper ends of the pockets overlie the corresponding panel 7 and all three sheets are secured thereto by screws 14 or other fastening means bordering the manifold and locating between the pockets.

The underlying sheet 10 is also provided with vertical pockets 15 closed at both ends and disposed on the opposite side of the sheet 9 from the pockets 13 so that the sheet 9 forms tension webs 16 between the mating pockets 13 and 15. The tension webs are provided with perforations 17. The manifold duct 12 is supplied with inflation air through a supply tube 18 from a pump, not shown, regulated at a nominal pressure above the plenum pressure, for example, 5 p.s.i.g. The inflation air causes each pair of pockets to form an inflated column of elliptical cross section, which, however, is yieldable and deformable so as to comply with an underlying solid surface or obstruction.

Extending between the sidewall hulls at the forward end of the carrier platform is a forward air barrier 19, and extending between sidewalls at the rearward end of the carrier platform is a rearward barrier 20.

The forward barrier includes a supporting, transverse, hollow strut 21 attached to the sidewall hull forwardly projections 3. The hollow strut receives inflation air from the previously mentioned inflation pump. Attached hermetically by its forward margins to the strut 21 is a forward air-bag seal 22 of rectangular platform, and of flattened elliptical cross section in longitudinal vertical planes. The air-bag seal trails downward from the strut 21 in such a manner that its rearward margin contacts the water or ground underlying the craft and its sides contact the inside walls of the sidewall hulls 2. An accordian seal web 23 is interposed between the upper surface of the air-bag 22 and an extension 24 of the platform 1, so as to contain the air beneath the carrier platform. The forward air-bag seal 22, when inflated, is constrained to elliptical cross sections by elliptical fabric tension webs 25 sewn to the bag interior, or by alternate constructions.

To avoid attached water flow up the rearward surface 26 of the air-bag, which would draw the air-bag downward into the water and increase undesirable wetted surface and drag, the under surface of the front air-bag is equipped with a novel, multistepped surface. For example, as shown in FIGURE 5, the steps may consist of transverse flexible slats 27 of wedge-shaped cross section, made of hard or semihard rubber or the like and vulcanized or otherwise bonded to the forward air-bag 22 with their thicker edges trailing. Alternately, as shown in FIGURE 6, each step consists of an external thin plate 28 backed by a backing plate 29, so as to clamp the bag. The plates 28 overlap to provide a stepped or shingled surface.

At the rearward or trailing edge of each wedge slat 27, or shingle plate 28, is a series of orifices 30 through the air-bag fabric, permitting a slight flow of bag inflation air to emerge behind each step.

As shown in FIGURES 1 and 8, the rearward barrier 20 includes two laterally adjacent air-bags 31 that are similar in shape, construction and method of support to the front air-bag barrier, but are contiguous along the craft longitudinal plane of symmetry. The rearward air-bags 31 are confined between the inside walls of the rearward sidewall extensions 4, and their rearward margins are urged downward elastically toward the underlying water or ground surface. The position of each rearward air-bag is separately adjustable.

This may be accomplished by pneumatic thrust cells 32 having accordian walls 33, the thrust cells being interposed between each rearward air bag 31 and a cross plate 34 extending between the sidewall extensions 4. Air is supplied from a line 35 connected to the inflation air pump having a valve 36 and escapes through a bleed orifice 37 which may be fixed or adjustable.

Figure 10:
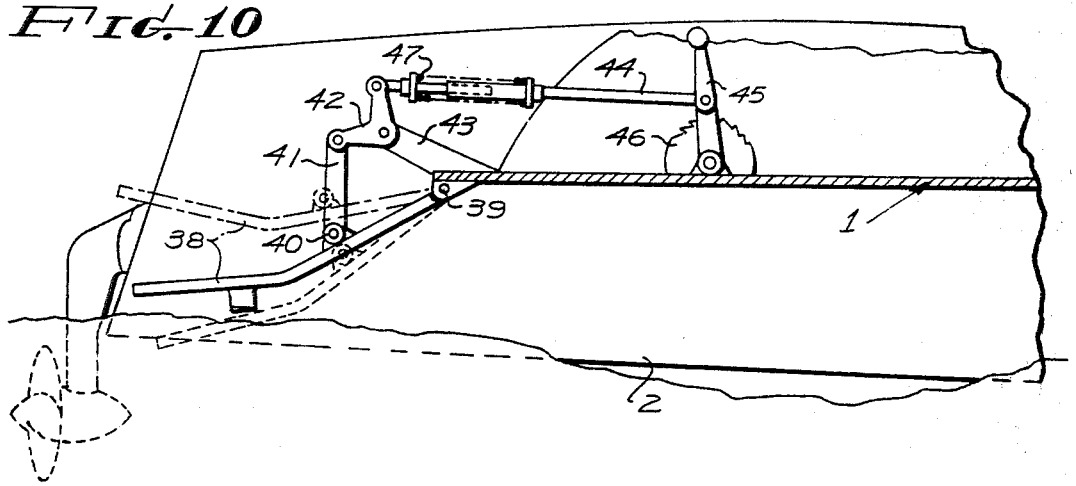
FIGURE 10 is a view similar to FIGURE 8, showing a modified rearward seal construction.

A modified rear air barrier is shown in FIGURE 10. This construction includes two side-by-side aft gates or doors 38, of foam sandwich construction, joined by hinges 39 to the rearward margin of the carrier platform 1. The aft doors trail downwardly and rearwardly and are contained by the inner walls of the sidewall hull rear projections 4. The aft doors are separately downloaded yieldably toward the underlying surface. Yieldable or elastic downloads are, for purposes of illustration, adjusted by a control mechanism that includes an attachment fitting 40 on each door, each joined by a link 41 to a bellcrank 42 supported from the platform 1 by a mounting bracket 43 and connected by a linkage 44 to a control lever 45 that may be secured in a desired position by a ratchet quadrant 46. The linkage includes a compression spring 47 so that force is transmitted through the spring in order that each door be supported yieldably in any given adjusted position.

Referring again to FIGURE 8, a transverse row of small planing surfaces 48 is located forwardly of the rearward air bags 31. The planing surfaces are pressed elastically down against the underlying water surface. Each planing surface 48 is supported from its forward apex by an elastic strut 49 comprising one tine of the rake-like frame 50. The frame is supported by a two-truss linkage 51 attached to the lower surface of the carrier platform 1. The rearward truss 52 of the linkage rotates about a hinge 52a, while the forward truss 53 is integral with the frame 50. The forward truss 53 is pin-connected at its upper ends to sliding shoes 54 movable longitudinally in parallel tracks 55 secured to the carrier platform 1. A drawbar 56 positions the sliding shoes forward or rearward in their tracks to adjust the planing surfaces in height, or to retract them against the carrier platform.

Each sidewall hull 2, as shown in FIGURE 7, is provided with a distributor duct 57, and the bottom of each hull is provided with distributed orifices or perforations 58 for downward discharge of air from the hull. Air may be supplied from the previously mentioned inflation air pump, or as shown in FIGURE 7, from one or more pressure augmenting fans 59 which receives previously pressurized air from the plenum space under the platform.

Conventional propellers 60 are provided at the rear ends of the hulls 2. These may be fixed in position driven from a common engine, or individual engines, not shown, or by outboard motors. It is preferred, however, that the propellers be retractable or elevatable, especially for amphibious use.

Operation of the air-supported marine vehicle is described in several modes:

Before startup, when the vehicle is at rest on the water, the buoyant sidewall hulls 2 are partially submerged and the front barrier air-bag 22 and rear barrier air-bags 31 rest on the water. The carrier platform 1 is supported above the water.

In getting under way, first the main cushion supply fan 5 sends air into the craft's main plenum space, bounded by the carrier platform 1, the underlying water, the sidewall hulls 2, the forward barrier 19 and the rearward barrier 20. The peviously mentioned inflation pump, which may be driven off the main fan engine, inflates the forward and rearward air-bags 22 and 31. Plenum pressure lifts the craft until sidewall hulls are lightly contacting the water, and elastic download on the rearward air-bags 31 is adjusted by admitting inflation air through valves 36 to the thrust cells 32. Water is expelled from under the sidewall hull ducts 57 by starting the fans 59 to expel first water and then air bubbles. The inboard-outboard water propellers are then operated and the craft moves out.

In smooth water, approximately one third of full fan power is applied. The rearward barrier air-bags 31 are adjusted for lightest water contact. The independent, side-by-side air-bags provide more efficient sealing than a single air-bag during rolling transients or in diagonal swell. Main propulsion engines are set at, for example, 50 percent power for cruise, and steering is effected by steering the propellers or by differential throttling. For tight maneuvers, one propeller may be reversed. The sidewall hulls run at very shallow draft, so that their buoyant contribution to lift is negligible. The craft at cruise uses total horsepower amounting to under one half that of an equal-weight planing boat.

In rough-water cruise, the main fan power is raised to, for example, 80 percent of capacity so that cushion lift pressure can be maintained even though wave troughs cause frequent cushion air venting under the side hulls 2. High fan power is advantageous in providing the craft with a higher, smoother ride through rough water than would low fan power, and the high ride reduces wave-impact loading against the sidewalls. The reduced side hull immersion at high fan power reduces wetted friction drag, and cushion air venting aerates the underhull boundary layers. Both drag-reducing effects of the high ride serve to offset partially the cost of reserve fan power, or alternately serve to permit a higher top speed through waves, assuming fan and water propellers have independent engines.

When rough water (or a sudden turn) disturbs the craft in roll, the lower sidewall hull 2 is pressed into the water to abnormal draft, developing a buoyant restoring force up to one half of the craft's total weight. Similarly, in a pitch disturbance, for example a bow-down pitch, the side hull forward extensions 3 are abnormally immersed, generating a buoyant, bow-up restoring movement. A down transient in the heave mode (vertical translation with respect to the water surface) generates a buoyant restoring force from the over-submerged hulls as large as 1 g. An upward heave will in the limit vent all cushion overpressure, developing a gravity restoring force of almost 1 g.

To reduce fluctuations of plenum pressure caused by side hull venting in rough water, high fan flow permits the rearward air-bags 31 to be adjusted somewhat off the underlying water, with surplus fan flow jetting rearward under the air-bags and producing an assisting forward reaction thrust. The downloads applied by the thrust cells 32 on the rearward air-bags 31 are balanced by the pressure upload from the escaping plenum airflow beneath. Plenum pressure in this mode becomes self-stabilizing, because the elastic download on the rearward air bags 31 will close them if plenum pressure falls, and vice versa. The constant-r.p.m. main fan is protected from stall because it is looking into stabilized plenum pressure and stabilized volume flow. Also, stabilized plenum pressure reduces heave motion accelerations, thereby smoothing the ride. The rearward air-bags 31 at high air-flow track automatically over the wave contours with very little water contact and drag.

In storm mode, encounter with exposed storm conditions will require "heaving to," whereby water propellers are used only to idle forward and to hold bows into wind and sea. Sidewall flexible seals 6 are extended below the sidewall hulls to impede cushion venting through the large wave troughs, and main fan power is maintained at, for example, 80 percent power to provide the highest possible craft ride, thus minimizing exposure to wave impact damage. The inflated forward air-bag 16 is a compliant pneumatic structure best suited to absorb the very high wave impact pressures without damage.

In amphibious mode, when approaching debris, dense watergrowth, shoal, or landing beach, the craft is slowed and water propellers are retracted. Full fan power is applied and the craft proceeds under modest reaction thrust at almost zero draft over water. It is steered by differential adjustment of the air-spring chambers 32 above the two rearward air-bags 31 to produce lateral thrust vectoring. Proceeding from water onto a prepared solid surface, the craft moves at a very small hover height, which is increased somewhat by ejecting maximum "bubble" airflow downward through the sidewall hull-bottom orifices 58 to produce many small downward air jets.

Approaching rough beach, the craft deploys its side wall flexible seals 6 into the water. Then, as it pushes onto the beach, the sidewall hard structure is lifted several inches clear while the inflated seals retain cushion lift pressure. The sidewall flexible seals yield compliantly in moving forward over obstacles yet are stiff laterally, by virtue of the elliptical cross sections designed into the inflated vertical batten columns formed by the inflated pockets 13 and 15. The forward and rearward air-bags 22 and 31 resist abrasion by their stepped, surfaces 27. Appropriate abrasion resistant but yieldable shoes, not shown, may protect the wearing surfaces of the seals 6.

If the craft is designed for extensive travel over smooth shoal waters, mud flats, and marshes, power output of the main fan system is materially increased to replace the water propeller drives. With reaction thrust as prime propulsion, thrust is augmented by adding water spray to the mass flow of plenum air jetting under the lifted rearward air-bags 31. Water spray massflow larger than air massflow is thrown rearward into the air exhaust by adjusting the row of planing surfaces 48 against the water. Each unit of drag produced by the row of planing surfaces during spray production produces about 5 units of lift, rendering water spray injection by this novel technique less drag-costly than use of an inlet-pump-nozzle system.

The swept-back leading edges of the planing surfaces 48 and their support struts 49 are designed for non-fouling on marsh grasses.

While particular embodiments of this invention have been shown and described, it is not intended to limit the same to details of the construction set forth, but instead, the invention embraces such changes, modifications, and equivalents of the various parts and their relationships as come within the purview of the appended claims.

I claim:
1. An air cushion vehicle, comprising:
 (a) a carrier structure;
 (b) a pair of buoyant parallel hulls at opposite sides of said carrier structure, said hulls being sufficiently buoyant when waterborne, to support such carrier structure above the water surface, and including buoyant extensions projecting beyond said carrier structure;
 (c) a movable barrier at each end of said carrier structure, said barriers forming with said hulls a plenum;
 (d) and means for pressurizing said plenum to support said vehicle above an underlying surface.
2. An air cushion vehicle, as defined in claim 1, which further comprises:
 (a) inflatable side seals disposed in said plenum and movable between an inoperative retracted position above the lower portions of said hulls and an operative position in which said side seals overlie the inner sides of said hulls and project below said hulls;
 (b) and means for pressurizing said side seals above the pressure in said plenum.
3. An air cushion vehicle, comprising:
 (a) a carrier structure;
 (b) a pair of buoyant parallel hulls projecting below said carrier structure at opposite sides thereof;
 (c) a hull extension extending along the inner side of each hull and movable between an inoperative retracted position and above the submerged portion of said hull and an operative position alongside said hull in which said hull extension projects below said hull;
 (d) a barrier at the forward and rearward ends of said carried structure;
 (e) said carrier structure, barriers and said hulls as well as said hull extensions, when in their operative position, forming a plenum;
 (f) and means for pressurizing said plenum to support said carrier structure above an underlying surface.
4. An air cushion vehicle, as defined in claim 3, wherein:
 (a) said rearward barrier includes a longitudinally divided pair of inflatable bags joined to said carrier structure and extending downwardly and rearwardly therefrom;
 (b) and controls are provided to move said rearward barriers independently to effect variable rearward discharge of air from said plenum, thereby to effect forward propulsion and steering of said vehicle, said controls including means for applying a yieldable downward force opposing upward force of the plenum air on said barriers.
5. An air cushion vehicle, as defined in claim 3, wherein:
 (a) at least one of said barriers is inflatable and is provided with a plurality of external steps arranged in shingle relation.
6. An air cushion vehicle, as defined in claim 3, wherein:
 (a) an externally perforated duct extends along the bottom of each hull;
 (b) and a pump having an intake for plenum air and and outlet for air at augmented pressure communicates with each duct for outflow of air over the submerged portions of said hulls when said vehicle is waterborne.
7. An air cushion vehicle, comprising:
 (a) a carrier structure;
 (b) a pair of buoyant parallel hulls at opposite sides of said carrier structure;
 (c) a variable depth barrier extending between said hulls at the forward and rearward ends of said carrier structure to form with said structure and said hulls an air plenum;
 (d) means for pressurizing said plenum;
 (e) a duct within each hull having perforations for discharge of air over the submerged portion of said hull when said vehicle is waterborne;
 (f) and a pump having an intake for plenum air and an outlet communicating with said duct for outflow of air therefrom at an augmented pressure.
8. An air cushion vehicle, comprising:
 (a) a carrier structure;
 (b) a pair of buoyant spaced hulls at opposite sides of said carrier structure, said hulls being sufficiently buoyant, when waterborne, to support said carrier structure above the water surface;
 (c) a movable barrier at each end of said carrier structure, forming a plenum with said carrier structure and said hulls, at least one of said barriers being inflatable;
 (d) means for pressurizing said plenum at a first pressure, and said barrier at a second, higher pressure;
 (e) and a set of external steps on the water contacting area of said inflatable barrier.

9. An air cushion vehicle, comprising:
(a) a carrier structure;
(b) a pair of buoyant parallel hulls at opposite sides of said carrier structure, said hulls being sufficiently buoyant when waterborne, to support such carrier structure above the water surface;
(c) a movable barrier at each end of said carrier structure, said barriers forming with said hulls a plenum;
(d) means for pressurizing said plenum to support said vehicle above an underlying surface;
(e) and planing elements disposed forwardly of the rear barrier to produce a water spray for entrainment of air in the water passing under said rear barrier thereby to increase reaction thrust.

10. The combination with an air cushion vehicle having a carrier structure including side hulls and pressurizing means directed under said carrier structure of a barrier at each end of said carrier structure between said hulls forming therewith a plenum, at least one of said barriers comprising:

(a) a mounting means extending between said hulls;
(b) an inflatable bag secured along one margin to said mounting means, its opposite margin being directed toward and adapted to contact an underlying water surface;
(c) and a series of transversely extending steps formed on the water contacting region of said inflatable bag, said steps gradually increasing toward their trailing margins and terminating abruptly at said trailing margins.

References Cited

UNITED STATES PATENTS

| | | | |
|---|---|---|---|
| 3,066,753 | 12/1962 | Hurley et al. | 114—67 XR |
| 3,141,436 | 7/1964 | Cathers et al. | 114—67 XR |
| 3,207,113 | 9/1965 | Tattersall | 114—67 |

ANDREW H. FARRELL, Primary Examiner

U.S. Cl. X.R.

180—126